(12) United States Patent
Chen et al.

(10) Patent No.: US 9,936,196 B2
(45) Date of Patent: Apr. 3, 2018

(54) TARGET OUTPUT LAYERS IN VIDEO CODING

(71) Applicant: QUALCOMM Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 778 days.

(21) Appl. No.: 14/066,209

(22) Filed: Oct. 29, 2013

(65) Prior Publication Data

US 2014/0119437 A1 May 1, 2014

Related U.S. Application Data

(60) Provisional application No. 61/720,364, filed on Oct. 30, 2012.

(51) Int. Cl.
*H04N 7/32* (2006.01)
*H04N 19/597* (2014.01)
*H04N 19/70* (2014.01)
*H04N 19/30* (2014.01)

(52) U.S. Cl.
CPC ....... *H04N 19/00769* (2013.01); *H04N 19/30* (2014.11); *H04N 19/597* (2014.11); *H04N 19/70* (2014.11)

(58) Field of Classification Search
CPC ............................................. H04N 19/00769
USPC ................................................... 375/240.12
See application file for complete search history.

(56) References Cited

U.S. PATENT DOCUMENTS

| 8,712,215 B2 | 4/2014 | Ikeda et al. | |
| 2003/0215011 A1* | 11/2003 | Wang | H04N 19/176 375/240.03 |
| 2007/0086521 A1 | 4/2007 | Wang et al. | |
| 2010/0027681 A1 | 2/2010 | Pandit et al. | |
| 2010/0250763 A1 | 9/2010 | Bouazizi | |
| 2011/0032999 A1* | 2/2011 | Chen | H04N 21/234327 375/240.26 |

(Continued)

FOREIGN PATENT DOCUMENTS

| CN | 101578873 A | 11/2009 |
| JP | 2009296078 A | 12/2009 |

(Continued)

OTHER PUBLICATIONS

Taiwan Office Action and Search Report—TW102139401—TIPO—dated Aug. 24, 2015 (20 pages) including translation.

(Continued)

*Primary Examiner* — Jonathan Messmore
(74) *Attorney, Agent, or Firm* — Shumaker & Sieffert, P.A.

(57) ABSTRACT

In one example, a device includes a video coder configured to code a multilayer bitstream comprising a plurality of layers of video data, where the plurality of layers of video data are associated with a plurality of layer sets, and where each layer set contains one or more layers of video data of the plurality of layers, and to code on one or more syntax elements of the bitstream indicating one or more output operation points, where each output operation point is associated with a layer set of the plurality of layer sets and one or more target output layers of the plurality of layers.

30 Claims, 7 Drawing Sheets

(56) References Cited

U.S. PATENT DOCUMENTS

| | | | |
|---|---|---|---|
| 2012/0016917 A1* | 1/2012 | Priddle | H04N 5/91 707/827 |
| 2012/0023249 A1 | 1/2012 | Chen et al. | |
| 2012/0133736 A1 | 5/2012 | Nishi et al. | |
| 2013/0016776 A1 | 1/2013 | Boyce et al. | |
| 2013/0156101 A1* | 6/2013 | Lu | H04N 19/30 375/240.12 |
| 2014/0003491 A1 | 1/2014 | Chen | |

FOREIGN PATENT DOCUMENTS

| | | |
|---|---|---|
| TW | 201123841 A | 7/2011 |
| TW | 201215153 A | 4/2012 |
| WO | 2006108917 A1 | 10/2006 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Chen, et al., "AHG7: Target output views for MV-HEVC", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-00059, XP030130475, 2 pp.

Hattori "Study Text of Working Draft 5 of ISO/IEC 14496-10:2012/DAM 2 MVC extensions for inclusion of depth maps", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2/, No. JCT3V-B0226, XP030130407, 76 pp.

International Preliminary Report on Patentability from International Application PCT/US2013/067537, dated Feb. 25, 2015, 11 pp.

International Search Report and Written Opinion from International Application PCT/US213/067537, dated Jan. 15, 2014, 11 pp.

Vetro, et al., "Overview of the Stereo and Multiview Video Coding Extensions of the H.264/MPEG-4 AVC Standard," Proceedings of the IEEE, Apr. 2011, vol. 99 (4), pp. 626-642.

Wang, et al., "AHG9: on video parameter set," JCT-VC Meeting; MPEG Meeting; Oct. 10-19, 2012; Shanghai; (Joint Collaborative Team on Video Coding of ISO/IEC JTC1/SC29/WG11 and ITU-T SG.16); URL: http://wftp3.itu.int/av-arch/jctvc-site/, No. JCTVC-K0125, XP030113007, 7 pp.

Second Written Opinion from International Application PCT/US2013/067537, dated Oct. 13, 2014, 77 pp.

Tech, et al., "MV-HEVC Working Draft 1," Document: JCT3V-A1004_d0, Stockholm, SE, Jul. 16-20, 2012, 20 pp.

Response to Written Opinion dated Jan. 15, 2014 from International Application PCT/US2013/067537, filed on Aug. 29, 2014, 26 pp.

Response to Second Written Opinion dated Oct. 13, 2014, from International Application PCT/US2013/067537, filed on Nov. 13, 2014, 20 pp.

Chen Y., et al., "AHG12: Video parameter set and its use in 3D-HEVC", 9. JCT-VC Meeting; 100. MPEG Meeting; Apr. 27, 2012-Jul. 5, 2012; GENEVA; (Joint Collaborative Team on Video Coding of ISO/IEC JTC1/SC29/WG11 and ITU-T SG.16); URL: http://wftp3.itu.int/av-arch/jctvc-site/, No. JCTVC-I0571, Apr. 28, 2012 (Apr. 28, 2012), XP030112334, 9 pages, the whole document.

Vetro A., et al., "Joint Draft 8.0 on Multiview Video Coding," Joint Video Team (JVT) of ISO/IEC MPEG & ITU-T VCEG (ISO/IEC JTC1/SC29/WG11 and ITU-T SG16 Q.6), 28th Meeting: Hannover, DE, Jul. 20-25, 2008, URL:http://wftp3.itu.int/av-arch/jvt-site/2008_07_Hannover/JVT-AB204.zip, JVT-AB204, Nov. 27, 2008, pp. 1-73.

Wang Y. K., et al., "On MVC HRD and bitstream restriction", 27. JVT Meeting; Apr. 24, 2008-Apr. 29, 2008; GENEVA; (Joint Video Team OFISO/IEC JTC1/SC29/WG11 AND ITU-T SG.16), No. JVT-AA020, Apr. 28, 2008 (Apr. 28, 2008), XP030007363, ISSN: 0000-0091.

Tech, et al., "3D-HEVC Test Model 1," Document JCT3V-A1005_d0, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 83 pages.

Bross B., et al., "WD4: Working Draft 4 of High-Efficiency Video Coding," JCTVC-F803, MPEG Meeting; Jul. 14, 2011-Jul. 22, 2011; Torino; (Joint Collaborative Team on Video Coding of ISO/IEC JTC1/SC29/WG11 and ITU-T SG.16), No. JCTVC-F803-v3; (Sep. 8, 2011), 222 pages.

Vetro A., et al., "Joint Draft Multi-View Video Coding 4.0 (MVC)", 24. JVT Meeting. MPEG Meeting; Jun. 29, 2007-Jul. 5, 2007; Geneva, CH; (Joint Video Team of ISO/IEC JTC1/SC29/WG11 and ITU-T SG.16), No. JVT-X209, Jul. 21, 2007 (Jul. 21, 2007), XP030007208, 34 pages.

\* cited by examiner

TARGET OUTPUT LAYERS IN VIDEO CODING

This application claims the benefit of U.S. Provisional Patent Application No. 61/720,364, filed, 30 Oct. 2012, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, such as Scalable Video Coding (SVC) and Multiview Video Coding (MVC). Version 6 of the Working Draft (WD) of HEVC, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, 1-10 Feb. 2012, is available from http://phenix.it-sudparis.eu/jct/doc_end_user/current_document.php?id=5096. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

Techniques of this disclosure include determining one or more target output layers in multiview video coding and/or scalable video coding. For example, an operation point, as defined in the current HEVC base specification (WD 6, as noted above), may include a number of layers of video data, such that an operation point refers to a layer set having one or more layers of a video data bitstream. In some instances, only a sub-set of such layers may be decoded for output, e.g., display. According to aspects of this disclosure, an output operation point may be defined that specifically identifies the target layers of video data for output.

In one example, a method of decoding video data includes obtaining, from a multilayer bitstream, a plurality of layers of video data including a plurality of layer sets, where each layer set contains one or more layers of video data of the plurality of layers, and determining, based on one or more syntax elements of the bitstream, one or more output operation points, where each output operation point is associated with a layer set of the plurality of layer sets and one or more target output layers of the plurality of layers.

In another example, a method for encoding video data includes encoding a plurality of layers of video data including a plurality of layer sets, where each layer set contains one or more layers of video data of the plurality of layers, and encoding one or more syntax elements indicating one or more output operation points, where each output operation point is associated with a layer set of the plurality of layer sets and one or more target output layers of the plurality of layers.

In another example, an apparatus includes one or more processors configured to code a multilayer bitstream comprising a plurality of layers of video data, where the plurality of layers of video data are associated with a plurality of layer sets, and where each layer set contains one or more layers of video data of the plurality of layers, and to code on one or more syntax elements of the bitstream indicating one or more output operation points, where each output operation point is associated with a layer set of the plurality of layer sets and one or more target output layers of the plurality of layers.

In another example, a device for coding video data includes means for coding a multilayer bitstream comprising a plurality of layers of video data, where the plurality of layers of video data are associated with a plurality of layer sets, and where each layer set contains one or more layers of video data of the plurality of layers, and means for coding on one or more syntax elements of the bitstream indicating one or more output operation points, where each output operation point is associated with a layer set of the plurality of layer sets and one or more target output layers of the plurality of layers.

In another example, a non-transitory computer-readable storage medium has stored thereon instructions that, when executed, cause a processor of a device for coding video data to code a multilayer bitstream comprising a plurality of layers of video data, where the plurality of layers of video data are associated with a plurality of layer sets, and where each layer set contains one or more layers of video data of the plurality of layers, and code on one or more syntax elements of the bitstream indicating one or more output operation points, wherein each output operation point is associated with a layer set of the plurality of layer sets and one or more target output layers of the plurality of layers.

The details of one or more examples are set forth in the accompanying drawings and the description below. Other features, objects, and advantages will be apparent from the description and drawings, and from the claims.

DETAILED DESCRIPTION

Figure 1:
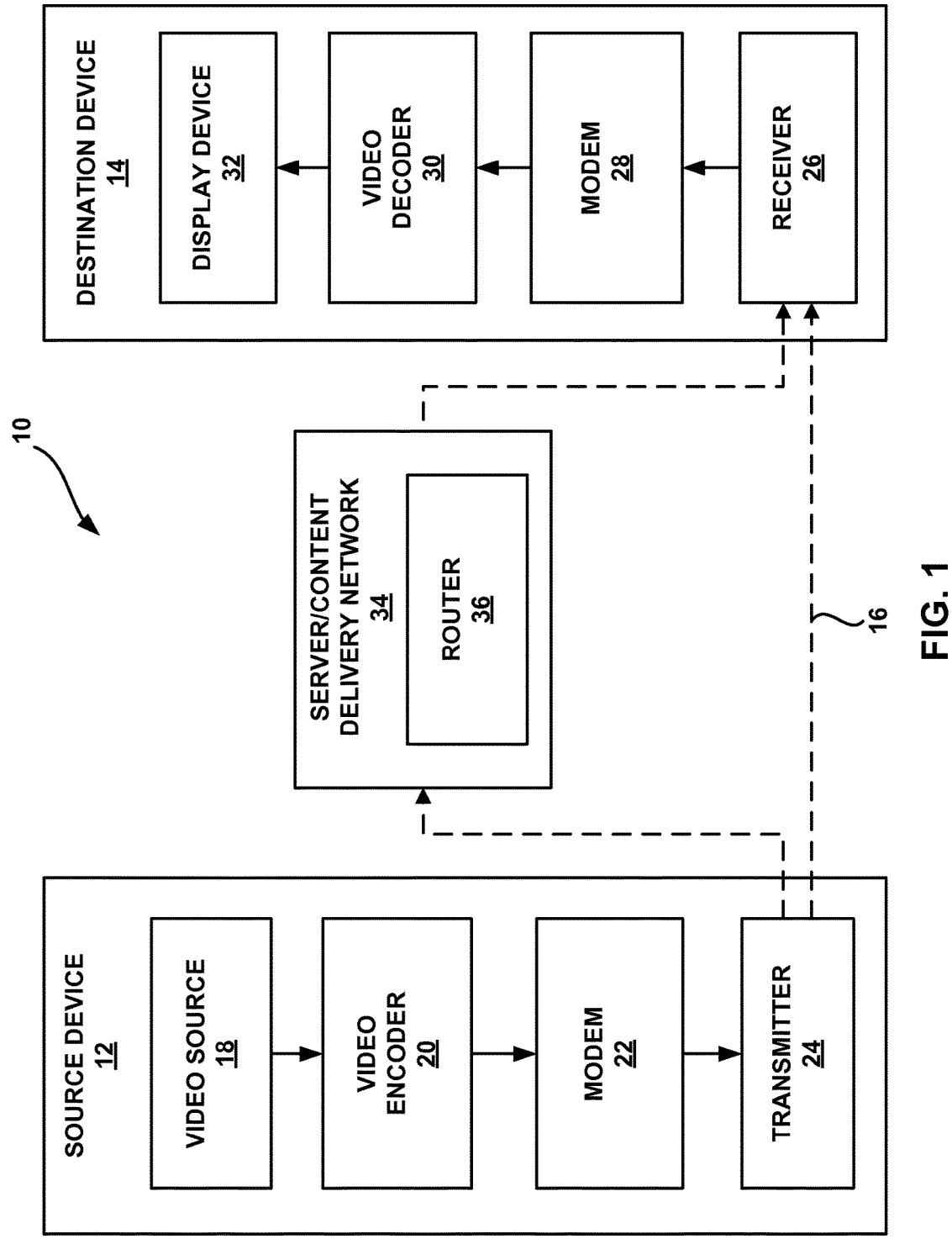
FIG. 1 is a block diagram illustrating an example video encoding and decoding system that may utilize techniques for determining one or more target output layers, according to aspects of this disclosure.

Techniques of this disclosure include determining one or more target output layers in multiview video coding and/or scalable video coding. Currently, the Motion Pictures Experts Group (MPEG) is developing a three-dimensional video (3DV) standard based on the upcoming high efficiency video coding (HEVC) standard. Part of the standardization efforts also includes the standardization of a multiview video codec and a scalable video codec based on HEVC based on HEVC. For example, one standardization effort includes development of a multiview extension of HEVC, referred to as MV-HEVC, and another is depth enhanced HEVC-based full 3DV codec, referred to as 3D-HEVC. With respect to scalable video coding, view scalability and/or spatial scalability may also contribute to three dimensional video services, as such scalabilities allow for backward-compatible extensions for more views, and/or enhancing the resolution of views in a way that allows decoding by legacy devices.

For three-dimensional video data, in general, each view corresponds to a different perspective, or angle, at which corresponding video data of a common scene was captured. The coded views can be used for three-dimensional (3D) display of video data. For example, two views (e.g., left and right eye views of a human viewer) may be displayed simultaneously or near simultaneously using different polarizations of light, and a viewer may wear passive, polarized glasses such that each of the viewer's eyes receives a respective one of the views. Alternatively, the viewer may wear active glasses that shutter each eye independently, and a display may rapidly alternate between images of each eye in synchronization with the glasses.

With multiview coding, such as Multiview Video Coding (MVC) as set forth in Annex H to the ITU-T H.264 standard (alternatively referred to as MPEG-4, Part 10, Advanced Video Coding (AVC) standard), a particular picture of a particular view is referred to as a view component. That is, a view component of a view corresponds to a particular temporal instance of the view. Multi-view video may contain a relatively large amount of inter-view statistical dependencies, as all cameras used to capture the multi-view data capture the same scene from different viewpoints. Such dependencies can be exploited for combined temporal and/or inter-view prediction, where images are not only predicted from temporally neighboring images, but also from corresponding images from other views. That is, inter-view prediction may be performed among pictures in the same access unit (i.e., within the same time instance).

As noted above, scalable video coding may also be used to code multiple views to provide view scalability and/or spatial scalability. For example, Scalable Video Coding (SVC) is described in Annex G to the H.264/AVC standard, and may be used to code multiple layers of video data. In some instances, each layer may correspond to a particular view.

As described herein, a video "layer" may generally refer to a sequence of pictures having at least one common characteristic, such as a view, a frame rate, a resolution, or the like. For example, a layer may include video data associated with a particular view of multiview video data. As another example, a layer may include video data associated with a particular layer of scalable video data. Thus, this disclosure may interchangeably refer to a layer and a view of video data.

In any case, a video coder (such as a video encoder or video decoder, as described in greater detail below) may use one or more parameter sets to describe or determine a variety of characteristics of coded video data. With parameter sets, infrequently changing information need not to be repeated for each picture or sequence of pictures, thereby increasing coding efficiency. In some instances, parameter sets may form a portion of a video bitstream. In other instances, parameter sets may be received by a video decoder in other manners (e.g., out-of-band transmission, hard coding, or the like). A coded video sequence together with its associated parameter sets may represent an independently decodable portion of a video bitstream.

HEVC inherits the parameter set concept of H.264/AVC, but includes several modifications and additions. In general, a sequence parameter set (SPS) contains information that applies to all slices of a coded video sequence. In HEVC, a coded video sequence contains all pictures between a first instantaneous decoding refresh (DR) picture (included in the sequence) and the following IDR picture (not included in the sequence) or the end of the bitstream (if the first IDR picture is the last one in the bitstream). A picture parameter set (PPS) contains information that may change from picture to picture.

HEVC also includes a video parameter set (VPS) structure. In general, a VPS describes the overall characteristics of a coded video sequence, including the dependences between temporal sublayers. A VPS may enable the compatible extensibility of the HEVC standard at a systems layer. For example, a VPS may provide additional information about a scalable or multiview bitstream structure that may be relevant for a decoder capable of decoding such layers, but that allows a legacy decoder to decode a base layer and ignore such layers.

When multiple layers of video data are included in a bitstream, an operation point may be used to parse or extract certain layers from the bitstream. For example, a multilayer bitstream may include a plurality of operation points to facilitate decoding and displaying a subset of received encoded data. As described herein, an "operation point" may generally refer to a layer set, which may include one or more layers of video data. As noted above, a layer may generally refer to a sequence of pictures having at least one common characteristic, such as a view, a frame rate, a resolution, or the like (e.g., a view of video data, a layer of scalable video da(a, and the like). Thus, an operation point may refer to a layer set having one or more views of video data, one or more layers of video data, or the like. Accordingly, an "operation point" and a "layer set" may be used interchangeably herein.

Using different operation points may allow various client devices to perform adaptation. That is, client devices with different rendering and decoding capabilities may extract different views to display two-dimensional or three-dimensional video data. The client devices may also negotiate with a server device to retrieve data of varying bitrates to adapt to transportation media of various bandwidth capabilities.

Accordingly, each operation point may represent a different combination of views of multiview video data and/or a different combination of layers of scalable video data encoded at varying temporal frame rates and spatial resolutions, e.g., different layer sets. In other words, an operation point may refer to an encoding of multiview video data in three dimensions including the view dimension (reflecting the number of views), the temporal dimensional (reflecting a frame rate) and spatial dimension (reflecting spatial resolution). In some instances, more than one operation point may be associated with the same bitstream subset. That is, more than one layer set may be associated with the same bitstream, such that a bitstream includes one or more sets of layers.

A video encoder may define a number of layer sets for various combinations of base views/layers and enhancement views/layers. A particular layer set may include a number of layers of video data, including one or more target output layer for display. For example, a target output view may include a view of multiview video data that is intended to be output, viewable when displayed. Likewise, a target output layer may include a layer of scalable video data that is intended to be output. As described herein, target output view and target output layer may be used interchangeably.

For example, with respect to MVC, operation points may be signaled in an SPS. Target output views of MVC data may be signaled together with a target highest temporal level of the MVC data. With respect to SVC, a target output layer may automatically be selected according to the highest layer of an operation point, e.g., with the highest dependency_id and quality_id. With respect to HEVC, an operation point may specify a sub-bitstream that may be extracted based on the highest temporal level of the sub-bitstream, HEVC may also use a list of nuh_reserved_zero_6 bits values, which may be renamed to layer_ids.

When adapting HEVC for use with multiple layers of video data, such as for a multi view coding extension of HEVC (MV-HEVC), operation points may be signaled solely in a VPS. For example, the views that are present in the bitstream (to be decoded) may be signaled in a VPS for each operation point. With respect to the standardization of a scalable extension of HEVC (HSVC, or, alternatively SHVC), it is anticipated that the layer with the highest layer_id will be the target output layer for a particular operation point.

The current approach to operation points in HEVC including using the VPS structure may have drawbacks when coding with multiple layers. For example, the operation points defined in HEVC may be sufficient for bitstream extraction purposes, but the VPS does not specify target output views/layers of the operation points. That is, the VPS does not identify the particular layers of video data that are intended to be displayed.

Without knowing which layers are target output layers, decoded pictures of certain layers that are not used for output may be kept in a decoded picture buffer (DPB) for longer than needed, thereby increasing storage requirements for multiview sequences. In addition, when multiple views are included in a sub-bitstream, a content provider want to control which sub-bitstreams are decoded and provided as an output to a display to control the viewing experience. For example, the content provider may not want to allow a user to view pictures from a certain sub-bitstream or combination of sub-bitstreams. Such control may not be available with the current VPS scheme of HEVC.

Techniques of this disclosure include determining, from a plurality of layers of video data including a number of layer sets (each containing one or more layers of video data), one or more output operation points associated with a layer set of the number of layers sets and one or more target output layers. For example, the techniques of this disclosure include determining an output operation point that identifies one or more target output views for multiview video data and/or target output layers for scalable video data.

Techniques of this disclosure also include signaling, by a video encoder, one or more syntax elements indicating the output operation point and/or target output layers, and parsing, by a video decoder from an encoded bitstream, one or more syntax elements indicating the output operation point and/or target output layers. Providing and utilizing an indication of an output operation point with target output layer(s) may increase efficiency with respect to decoded picture buffer management, and may increase flexibility with respect to indicating particular views and/or layers to be output (e.g., displayed).

According to aspects of this disclosure, one operation point, as defined in the current HEVC base specification (e.g., WD 6, as noted above), may correspond to one or more output operation points, with each output operation point having different target output view(s) and/or layer(s). For example, in some instances, a video coder (such as a video encoder or video decoder) may use a number of layers of video data of a layer set to properly code the video data. However, only a sub-set of the decoded layers may be desirable for output, e.g., display. According to aspects of this disclosure, the video coder may determine an output operation point that specifically identifies the target layers of video data for output. In some instances, the video coder may determine more than one output operation point for a layer set, e.g., to accommodate different combinations of layers of video data for output.

In an example for purposes of illustration, assume that a layer set includes a base view (view0), a first view (view1), a second view (view2), and a third view (view3) for a stereo application (e.g., two views for output). Assume further that view2 and view3 provide an optimal stereo output. In this example, a video decoder may use the base view as a reference to decode view2 and view3. In addition, if the video decoder conforms to certain conventional coding standards (such as the MVC or SVC extensions to H.264/AVC noted above), the video decoder may select the highest level of the operation point for output, i.e., the base layer, despite view2 and view3 being the optimal views for output.

According to aspects of this disclosure, a layer set specifies the one or more sub-bitstreams that are decoded, and an output operation point indicates a subset of layers within the layer set that are to be output. Thus, in the example above, a video decoder may decode the layer set having the base view, the first view, the second view, and the third view. In addition, the video decoder may determine an output operation point for the layer set, where the output operation point includes view2 and view3. Thus, the video coder may decode and output view2 and view3 for display.

An output operation point, as described above, was not previously specified for HEVC. In addition, the MVC extension to H.264/AVC did not encounter the issue of determining which sub-bitstreams of an operation point are intended for display, because MVC does not use the concept of operation points and all target views of an MVC bitstream are specified by all views in the bitstream. Accordingly, while the techniques of this disclosure may be implemented with a variety of standards, aspects of this disclosure provide a mechanism for specific target output views of an operation point to be specified using the HEVC standard.

FIG. 1 is a block diagram illustrating an example video encoding and decoding system 10 that may utilize techniques for determining one or more target output layers, according to aspects of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 11 includes input interface 28, video decoder 30, and display device 32. In accordance with this disclosure, video encoder 20 of source device 12 may be configured to apply the techniques for determining one or more target output layers. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining one or more target output layers may be performed by any digital video encoding and/or decoding device. Although generally the techniques of this disclosure are performed by a video encoding device, the techniques may also be performed by a video encoder/decoder, typically referred to as a. "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

In the example shown in FIG. 1, system 10 also includes server/content delivery network 34 having router 36. In some examples, source device 12 may communicate with server/content delivery network 34 via a variety of wireless and/or wired transmission or storage media, as described above. Moreover, while shown separately in the example of FIG. 1, in some examples, source device 12 and server/content delivery network 34 comprise the same device. Server/content delivery network 34 may store one or more versions of coded video data (from video encoder 20 of source device 12), and may make such coded video data available for access by destination device 14 and video decoder 30. In some examples, router 36 may be responsible for providing coded video data to destination device 14 in a requested format.

This disclosure may generally refer to video encoder 20 and/or server/content delivery network 34 "signaling" certain information to another device, such as video decoder 30. It should be understood, however, that video encoder 20 and/or server/content delivery network 34 may signal information by associating certain syntax elements with various encoded portions of video data. That is, video encoder 20 and/or server/content delivery network 34 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. Other examples of video compression standards include MPEG-2 and ITU-T H.263.

While the techniques of this disclosure are not limited to any particular coding standard, the techniques may be relevant to the HEVC standard. More specifically, video encoder 20 and video decoder 30 may be configured to code video data according to an extension of the HEVC standard, e.g., a multiview extension or three-dimensional video (3DV) extension, including a scalable video coding (SVC) extension.

In general, HEVC allows a video picture to be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of hum samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process my reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

In some examples, video encoder 20 may generate and video decoder 30 may receive certain parameter sets, which may be used when decoding video data. For example, parameter sets may include an SPS, PPS, or VPS, which improve efficiency by separately signaling infrequently changing information. Furthermore, the use of parameter sets may enable out-of-band transmission of the important header information, avoiding the need for redundant transmissions for error resilience. In out-of-band transmission examples, parameter set network abstraction layer (NAL) units may be transmitted on a different channel than other NAL units, such as Supplemental Enhancement Information (SEI) NAL units.

SEI NAL units (referred to as SEI messages) may contain information that is not necessary for decoding the coded pictures samples from VCL NAL units, but may assist in processes related to decoding, display, error resilience, and other purposes. SEI messages may be contained in non-VCL NAL units. SEI messages may be included in the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC.

In HEVC, video encoder 20 may define operation points to indicate a sub-bitstream that may be extracted from an encoded bitstream based on the highest temporal level of the sub-bitstream, as well as a list of nuh_reserved_zero_6 bits. For example, video encoder 20 may signal operation points according to Table 1, shown below:

TABLE 1

Operation Points

| operation_point_layer_ids( opIdx ) { | Descriptor |
|---|---|
| for( i = 0; i <= vps_max_nuh_reserved_zero_layer_id ; i++ ) | |
| op_layer_id_included_flag[ opIdx ][ i ] | u(1) |
| } | |

In Table 1 above, op_layer_id_included_flag[opIdx][i] equal to 1 may specify that the layer with layer_id equal to i is present for the opIdx-th set of layer_id values. In addition, op_layer_id_included_flag[opIdx][i] equal to 1 may specify that the layer with layer_id equal to i is not present for the opIdx-th set of layer_id values.

Video encoder 20 may also signal the syntax element vps_max_nuh_reserved_zero_layer_id in the VPS, where vps_max_nuh_reserved_zero_layer_id specifies the greatest value of nuh_reserved_zero_6 bits for all NAL units in the coded video sequence in the OpLayerIdSet of the operation points to which the opIdx-th hrd_parameters( ) syntax structure in the video parameter set applies.

In some instances, video encoder 20 may signal operation points for use with the multiview extension to HEVC (MV-HEVC) or the 3D-HEVC. The latest working draft of the multiview extension of MV-HEVC and 3D-HEVC are specified in "MV-HEVC Working Draft 1," Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, JCT3V-A1004, available at http://phenix.it-sudparis.eu/jct2/doc_en-d_user/documents/1_Stockholm/wg11/JCT3V-A1004-v1.zip and "3D-HEVC Test Model 1," Joint Collaborative Team on 3D Video Coding Extension Development of ITU-T SG 16 WP 3 and ISO/IEC JTC 1/SC 29/WG 11,1st Meeting: Stockholm, SE, 16-20 Jul. 2012, JCT3V-A1005, available at http://phenix.int-evry.fr/jct2/doc_end_user/documents/1_Stockholm/wg11/JCT3V-A1005-v1.zip, respectively.

The operation points of MV-HEVC and/or 3D0-HEVC may be signaled solely in the video parameter set. For example, video encoder 20 may signal the views to be present and decoded for each operation point.

As noted above, the operation points defined in HEVC may be sufficient for bitstream extraction purposes, but the VPS does not specify target output views/layers of the operation points. That is, the VPS does not identify the particular layers of video data that are intended to be displayed.

Without knowing which layers are target output layers, decoded pictures of certain layers that are not used for output may be kept in a decoded picture buffer (DPB) of video encoder 20 and/or video decoder 30 for longer than needed, thereby increasing storage requirements for multiview sequences. In addition, when multiple views are included in a sub-bitstream, a content provider associated with server/content delivery network 34 may want to control which sub-bitstreams are decoded by video decoder 30 and provided as an output to display device 32 to control the viewing experience. Such control may not be available with the current VPS scheme.

Video encoder 20 and video decoder 30 may be configured to perform one or more of the various techniques of this disclosure, alone or in any combination. For example, according to aspects of this disclosure, video encoder 20 may indicate, with one or more syntax elements in an encoded bitstream, data indicative of an operation point, e.g., a layer set, having a plurality of layers of video data. In addition, video encoder 20 may encode one or more syntax elements indicating an output operation point for the operation point, where the output operation point is associated with one or more target output layers of the plurality of layers of the video data.

Likewise, video decoder 30 may obtain, from an encoded bitstream, data indicative of an operation point, e.g., a layer set, having a plurality of layers of video data. In addition, video decoder 30 may determine based on one or more syntax elements of the encoded bitstream, an output operation point for the operation point, where the output operation point is associated with one or more target output layers of the plurality of layers of the video data.

For example, according to aspects of this disclosure, for a multiview extension to HEVC (MV-HEVC) or a three-dimensional video extension to HEVC (3DV, which may include one or more layers of depth da(a), video encoder 20 may signal target output layers for each output operation point in VPS or VPS extension. Video decoder 30 may receive such signaling and determine target output layers for each output operation point.

As an example, with respect to MV-HEVC, an output operation point may refer to a layer set with a list of identified target output views that belong to the views included in the operation point. Video encoder 20 may signal the output operation point in a VPS extension, as shown in the example of Table 2 below. Deletions to the text of MV-HEVC are marked with <dlt> . . . </dlt> tags.

TABLE 2

VPS Extension with Output Operation Point

| vps_extension( ) { | Descriptor |
|---|---|
| while( !byte_aligned( ) ) | |
|   vps_extension_byte_alignment_reserved_one_bit | u(1) |
| num_<dlt>additional</dlt>_layer_operation_points | u(10) |
| num_additional_profile_level_sets | u(8) |
| for( i = 0; i <= vps_max_layers_minus1; i++ ) { | |
|   num_types_zero_4bits[ i ] | u(4) |
|   type_zero_4bits[ i ] | u(4) |
|   view_id[ i ] | u(8) |
|   if( i > 0 ) | |
|     num_direct_ref_layers[ i ] | u(6) |
|     for( j = 0; j < num_direct_ref_layers[ i ]; j++ ) | |
|       ref_layer_id[ i ][ j ] | u(6) |
| } | |
| for( i = 0; i <= num_additional_profile_level_sets; i++ ) | |
|   profile_tier_level( 1, vps_max_sub_layers_minus1 ) | |
| for( i = 0; i < num_<dlt>additional</dlt>_layer_ operation_points; i++ ) { | |
|   op_point_index | u(10) |
|   for ( j = 0 ; j <= vps_max_nuh_reserved_zero_layer_id; j++) | |
|     if (op_layer_id_included_flag[ op_point_index ][ i ] ) | |
|       output_layer_flag[ op_point_index ][ j ] | u(1) |
|   if ( num_additional_profile_level_sets > 0 ) | |
|     profile_level_idx[ i ] | u(8) |
| } | |
| } | |

In the example of Table 2 above, num_layer_operation_points may specify the maximum number of output operation points present in the coded video sequences to which the video parameter set applies. In addition, op_point_index may identify the operation point based on which the current i-th output operation point is formed. In addition, output_layer_flag[op_point_index][j] equal to 1 may indicate the layer with layer_id equal to j is the target for output for the current i-th output operation point. In addition, output_layer_flag[j] equal to 0 may indicate the layer with layer_id equal to j is not the target for output for the current i-th output operation point.

As another example, video encoder 20 may signal the output operation point in a VPS, as shown in the example of Table 3 below:

TABLE 3

VPS with Output Operation Point

| for( i = 0; i < num_<dlt>additional</dlt>_layer_operation_points; i++ ) { | |
|---|---|
|   op_point_index | u(10) |
|   num_target_views[ i ] | u(6) |
|   for ( j = 0 ; j < num_target_views ; j++) | |
|     target_layer_id[ i ][ j ] | u(6) |
|   if ( num_additional_profile_level_sets ) | |
|     profile_level_idx[ i ] | u(8) |
| } | |

In the example of Table 3 above, num_target_views may specify the number of target output views for the current i-th output operation point. In addition, target_layer_id[i][j] may specify the layer_id of the j-th target output view of the current i-th output operation point.

In still another example, video encoder 20 may signal target output views using other syntax structures. For example, video encoder 20 may encoded data indicating target output views in an SEI message or using other out-of-band signaling techniques.

With respect to 3D-HEVC, an output operation point may refer to an operation point, e.g., a layer set, with a list of identified target output texture or depth views that belong to the views included in the operation point. Video encoder 20 may signal the output operation point for 3D-HEVC using syntax and semantics similar to those described above with respect to MV-HEVC. However, for 3D-HEVC, video encoder 20 each layer_id signaled to be a target output view may correspond to either a depth or texture view.

With respect to HSVC, the target output layer of an operation point may be derived to be the layer with the numerically highest layer_id. For example, an output operation point may be an operation point, e.g., a layer set, with only the layer having the largest layer_id in the operation point that is considered for output. Thus video decoder 30 may decode a layer_id syntax element to determine the output operation point for a particular operation point.

Thus, according to aspects of this disclosure, one operation point, as defined in the current HEVC base specification, may correspond to one or more output operation points, with each output operation point having different target output view(s) and/or layer(s). For example, video encoder 20 may signal in an encoded bitstream (and video decoder 30 may obtain by parsing an encoded bitstream) an indication of a sub-set of the decoded layers may be desirable for output, e.g., display. While described with respect to video encoder 20 above, in some examples, server/content delivery network 34 may be responsible for such signaling.

For example, server/content delivery network 34 may determine which layers of a bitstream are optimal for output. In this example, server/content delivery network 34 may be responsible for generating and/or altering a VPS, a VPS extension, an SEI message, or other structure for indicating target output layers for an output operation point.

Figure 2:
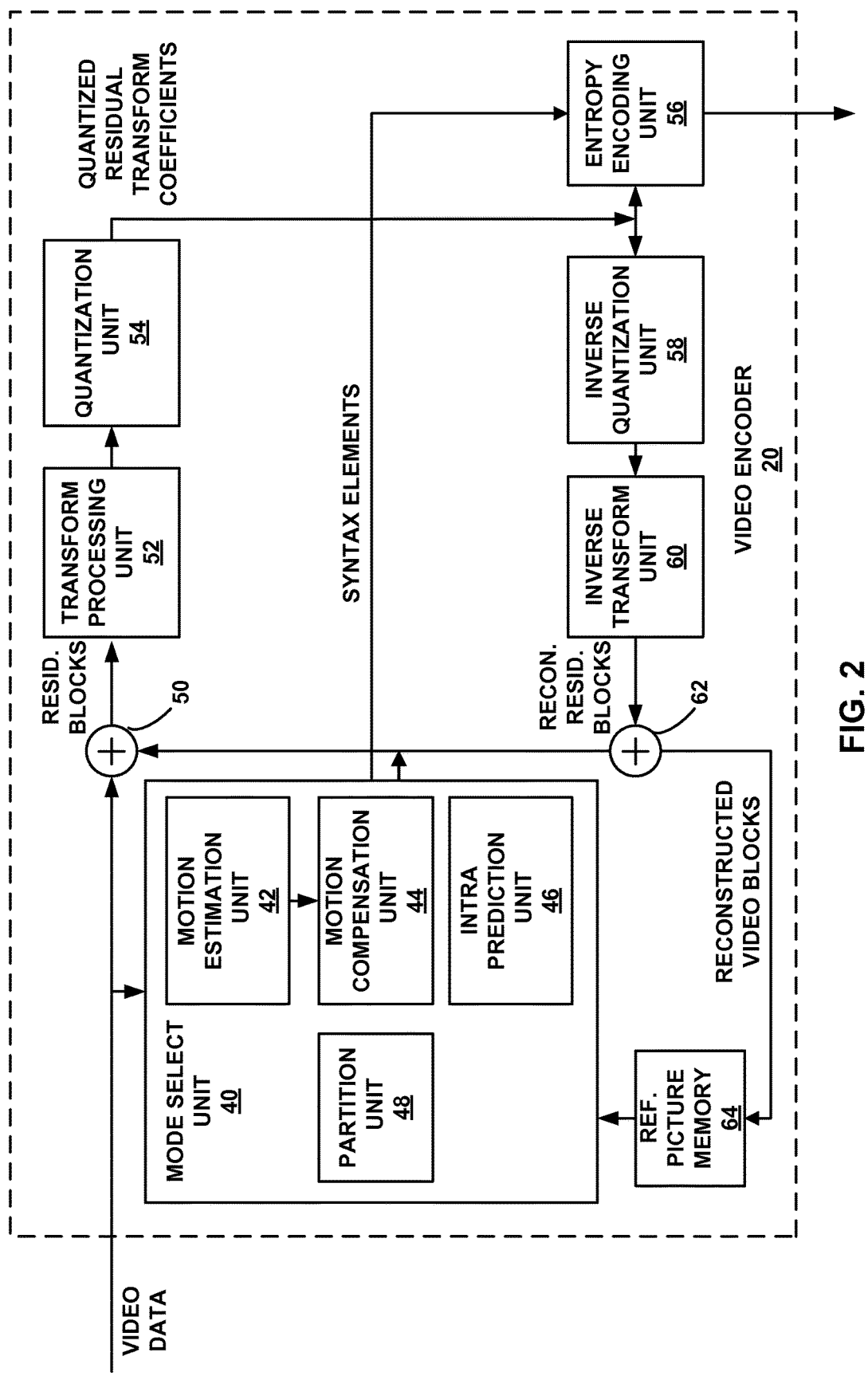
FIG. 2 is a block diagram illustrating an example of a video encoder that may implement techniques for determining one or more target output layers, according to aspects of this disclosure.
Figure 3:
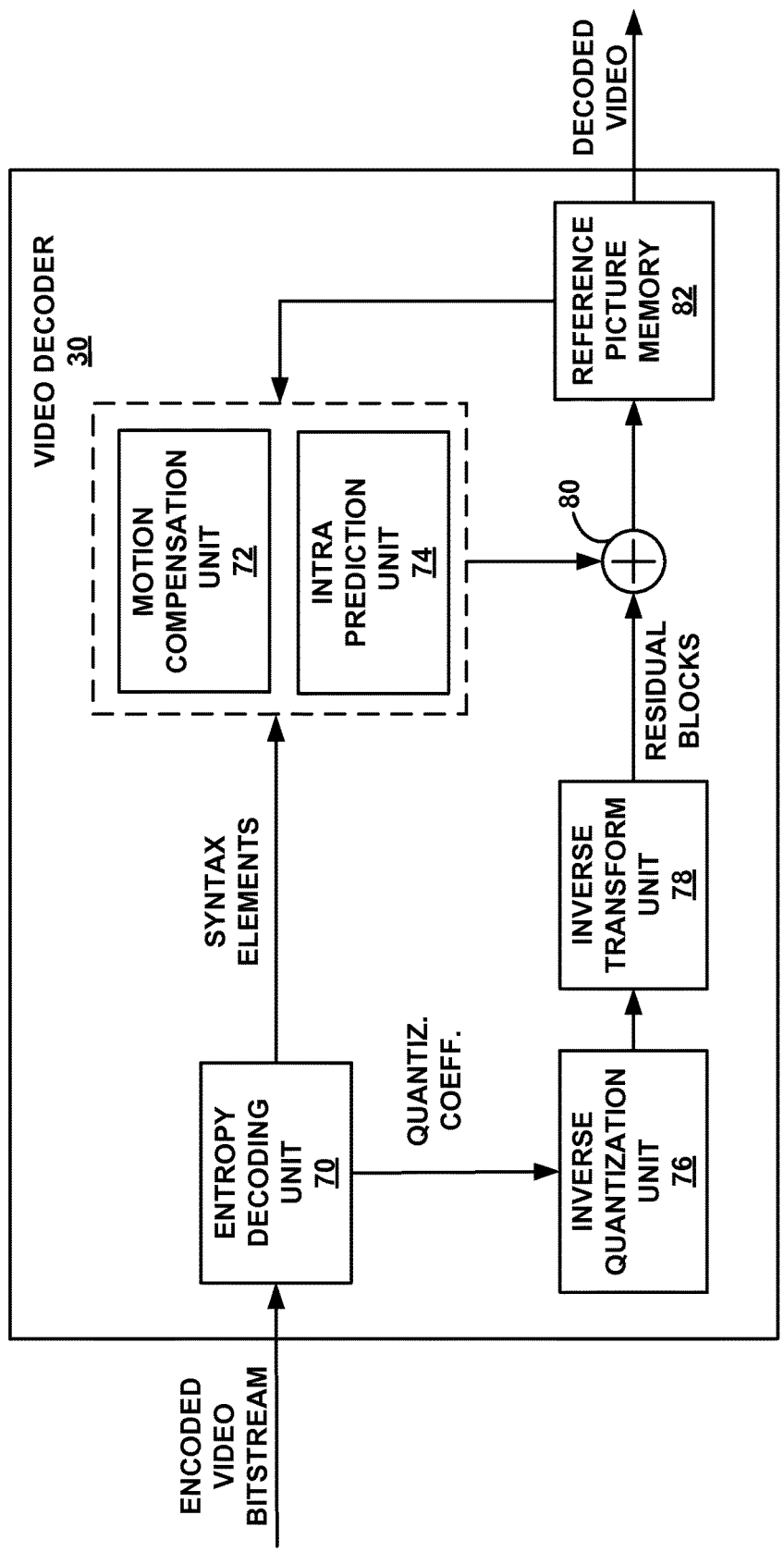
FIG. 3 is a block diagram illustrating an example of video decoder 30 that may implement techniques for determining one or more target output layers, according to aspects of this disclosure.

With respect to decoded picture buffer (also referred to as a reference picture memory, as described, for example, with respect to FIGS. 2 and 3) management, according to aspects of this disclosure, when an output operation point is being decoded, video encoder 20 and/or video decoder 30 may remove a decoded picture of a layer that is not targeted for output from the decoded picture buffer as long as the picture is no longer required for temporal prediction (e.g., inter prediction within a layer or a view) or inter-layer/inter-view prediction. For example, to facilitate removal, video encoder 20 may set a PicOutputFlag of each view component of a layer that does not belong to a target output view or layer equal to 0. Thus, video encoder 20 and/or video decoder 30 may determine which pictures are not used for reference and not output and remove such pictures from the decoded picture buffer based on the determination.

FIG. 2 is a block diagram illustrating an example of video encoder 20 that may implement techniques for determining one or more target output layers, according to aspects of this disclosure. Video encoder 20 may perform intra- and inter-coding of video blocks within video slices. Intra-coding relies on spatial prediction to reduce or remove spatial redundancy in video within a given video picture. Inter-coding relies on temporal prediction to reduce or remove temporal redundancy in video within adjacent pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As noted above, video encoder 20 may be adapted to perform multiview and/or scalable video coding. In some instances, video encoder 20 may be configured to conform to an MV-HEVC video coding standard, such that each view in a time instance may be processed by a decoder, such as video decoder 30. In other instances, video encoder 20 may be configured to conform to a 3D-HEVC video coding standard, and may be configured to encode a depth map for each view in addition to encoding texture maps (i.e., luma and chroma values) for each view. In still other instances, video encoder 20 may be configured to encode multiple, scalable layers of video data in accordance with an HSVC video coding standard. While reference is made to specific coding standards, it should be understood that the techniques are not specific to any one coding standard, and may be implemented with future and/or not yet developed standards.

In any case, as shown in FIG. 2, video encoder 20 receives a current video block within a video picture to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal prediction. Intra-prediction unit 46 may alternatively perform intra-predictive coding of the received video block relative to one or more neighboring blocks in the same picture or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate, distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction triode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

Video encoder 20 may generate a number of syntax elements, as described above, which may be encoded by entropy encoding unit 56 or another encoding unit of video encoder 20. In some examples, video encoder 20 may generate and encode syntax elements for a multiview and/or multilayer bitstream, as described above.

For example, according to aspects of this disclosure, entropy encoding unit 56 may encode one or more syntax elements in an encoded bitstream indicating an operation point, e.g., a layer set, having a plurality of layers of video data. In addition, entropy encoding unit 56 may encode one or more syntax elements indicating an output operation point for the layer set, where the output operation point is associated with one or more target output layers of the plurality of layers of the video data.

In some examples, according to aspects of this disclosure, video encoder 20 may indicate target output layers for an output operation point according to a video coding standard, such as MV-HEVC, 3D-HEVC, or HSVC. For example, with respect to multiview video coding (e.g., MV-HEVC or 3D-HEVC), video encoder 20 may encode a VPS extension such as that shown and described with respect to the example of Table 2 above), a VPS (e.g., such as that shown and described with respect to the example of Table 3 above), an SEI message, or other message to indicate one or more output operation points, with each output operation point having associated target output layers. As noted above, when encoding depth views, an output operation point may refer to an operation point with a list of identified target output texture or depth views that belong to the views included in the operation point.

With respect to HSVC, video encoder 20 may encode a layer_id to each layer of video data to identify each layer of video data (as described in greater detail, for example, with respect to FIG. 5 below). According to aspects of this disclosure, an output operation point may be an operation point with only the layer having the largest layer_id in the operation point that is considered for output.

Thus, according to aspects of this disclosure, one operation point, as defined in the current HEVC base specification, may correspond to one or more output operation points, with each output operation point having different target output view(s) and/or layer(s). For example, video encoder 20 may signal in an encoded bitstream indication of a sub-set of the decoded layers may be desirable for output, e.g., display.

According to some aspects of this disclosure, video encoder 20 may remove one or more pictures from reference picture memory 64 based on the determined output operation point and target output layers. For example, video encoder 20 may remove pictures from reference picture memory 64 that are not targeted for output and that are not required for temporal prediction (e.g., inter prediction within a layer or a view) or inter-layer/inter-view prediction.

In this way, video encoder 20 represents one example of a video encoder configured to encode a plurality of layers of video data including a plurality of layer sets, where each layer set contains one or more layers of video data of the plurality of layers. Video encoder 20 is also configured to encode one or more syntax elements of a bitstream indicating one or more output operation points, where each output operation point is associated with a layer set of the plurality of layer sets and one or more target output layers of the plurality of layers.

FIG. 3 is a block diagram illustrating an example of video decoder 30 that may implement techniques for determining one or more target output layers, according to aspects of this disclosure. In the example of FIG. 3, video decoder 30 includes an entropy decoding unit 70, motion compensation unit 72, intra prediction unit 74, inverse quantization unit 76, inverse transformation unit 78, reference picture memory 82 and summer 80.

As noted above, video decoder 30 may be adapted to perform multiview and/or scalable video coding. In some instances, video decoder 30 may be configured to conform to an MV-HEVC video coding standard. In other instances, video decoder 30 may be configured to conform to a 3D-HEVC video coding standard, and may be configured to decode a depth map for each view in addition to encoding texture maps (i.e., luma and chroma values) for each view. In still other instances, video decoder 30 may be configured to decode multiple, scalable layers of video data in accordance with an HSVC video coding standard. While reference is made to specific coding standards, it should be understood that the techniques are not specific to any one coding standard, and may be implemented with future and/or not yet developed standards.

Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Video decoder 30 may receive the syntax elements at the video slice level and/or the video block level.

Entropy decoding unit 70 decodes the bitstream to generate quantized coefficients, motion vectors or intra-prediction mode indicators, and other syntax elements. In some examples, entropy decoding unit 70 or another unit of video decoder may parse and decode syntax elements from a multiview and/or multilayer bitstream, as described above.

According to aspects of this disclosure, entropy decoding unit 70 may obtain, from an encoded bitstream, data indicative of an operation point, e.g., a layer set, having a plurality of layers of video data. In addition, entropy decoding unit 70 may decode on one or more syntax elements indicating an output operation point for the operation point, where the output operation point is associated with one or more target output layers of the plurality of layers of the video data. Video decoder 30 may determine based on the one or more syntax elements the output operation point and the target output layers.

In some examples, according to aspects of this disclosure, video decoder 30 may conform to a video coding standard, such as MV-HEVC, 3D-HEVC, or HSVC. For example, with respect to multiview video coding (e.g., MV-HEVC or 3-HEVC), video decoder 30 may parse sub-bitstreams from a received encoded bitstream based on an output operation point and target output layers indicated in a VPS extension (e.g., such as that shown and described with respect to the example of Table 2 above), a VPS (e.g., such as that shown and described with respect to the example of Table 3 above), an SEI message, or other message. When decoding depth views, an output operation point may refer to an operation point with a list of identified target output texture or depth views that belong to the views included in the operation point.

With respect to HSVC, entropy decoding unit 70 may decode a layer_id for each layer of video data. According to aspects of this disclosure, video decoder 30 may infer an output operation point based on the layer having the largest layer_id in the operation point.

Thus, according to aspects of this disclosure, one operation point, as defined in the current HEVC base specification, may correspond to one or more output operation points, with each output operation point having different target output view(s) and/or layer(s). Entropy decoding unit 70 may decode a sub-bitstream that includes the target output layers based on one or more syntax elements parsed and decoded from a received encoded bitstream.

Entropy decoding unit 70 forwards the motion vectors to and other syntax elements to motion compensation unit 72. For a particular output layer, when the video slice is coded as an intra-coded (I) slice, intra prediction unit 74 may generate prediction data for a video block of the current video slice based on a signaled intra prediction mode and data from previously decoded blocks of the current picture. When the video picture is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may use the decoded motion vector to retrieve data from a previously decoded picture, e,g., from reference picture memory 82. Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

According to some aspects of this disclosure, video decoder 30 may remove one or more pictures from reference picture memory 82 based on the determined output operation point and target output layers. For example, video decoder 30 may remove pictures from reference picture memory 82 that are not targeted for output and that are not required for temporal prediction (e.g., inter prediction within a layer or a view) or inter-layer/inter-view prediction. Video decoder 30 may determine whether pictures of reference picture memory 82 are used for prediction or included in a target output layer based on one or more syntax elements of the decoded bitstream. For example, entropy decoding unit 70 may decode a PicOutputFlag for each view component of a layer that indicates whether the picture belongs to a target output view. Video decoder 30 may remove pictures from reference picture memory 82 that do not belong to the target output view and that are marked "unused for reference" during decoding.

Accordingly, in an example, video decoder 30 may decode an output operation point of one or more output portion points associated with a layer set, as well as decode a set of decoded-but-not-output layers that include one or more layers that are not one of the one or more target output layers but belong to the layer set. In addition, video decoder 30 may mark a first decoded picture included in the one or more target output layers in a decoded picture buffer as a picture to be used for output, and mark a second decoded picture included in the set of decoded but not to be output layers in the decoded picture buffer as a picture not to be used for output, such that the picture not to be used for output is removed from the decoded picture buffer earlier than the picture to be used for output. In addition, video decoder 30 may determine whether the picture marked as not to be used for output is used for one of inter-prediction and inter-layer prediction, and remove the picture marked as not to be used for output from the decoded picture buffer when the picture not to be used for output is not used for one of inter-prediction and inter-layer prediction.

In this way, video decoder 30 represents one example of a video decoder 30 that may obtain, from a multilayer bitstream, a plurality of layers of video data including a plurality of layer sets, where each layer set contains one or more layers of video data of the plurality of layers. Video decoder 30 may also determine, based on one or more syntax elements of the bitstream, one or more output operation points, where each output operation point is associated with a layer set of the plurality of layer sets and one or more target output layers of the plurality of layers.

Figure 4:
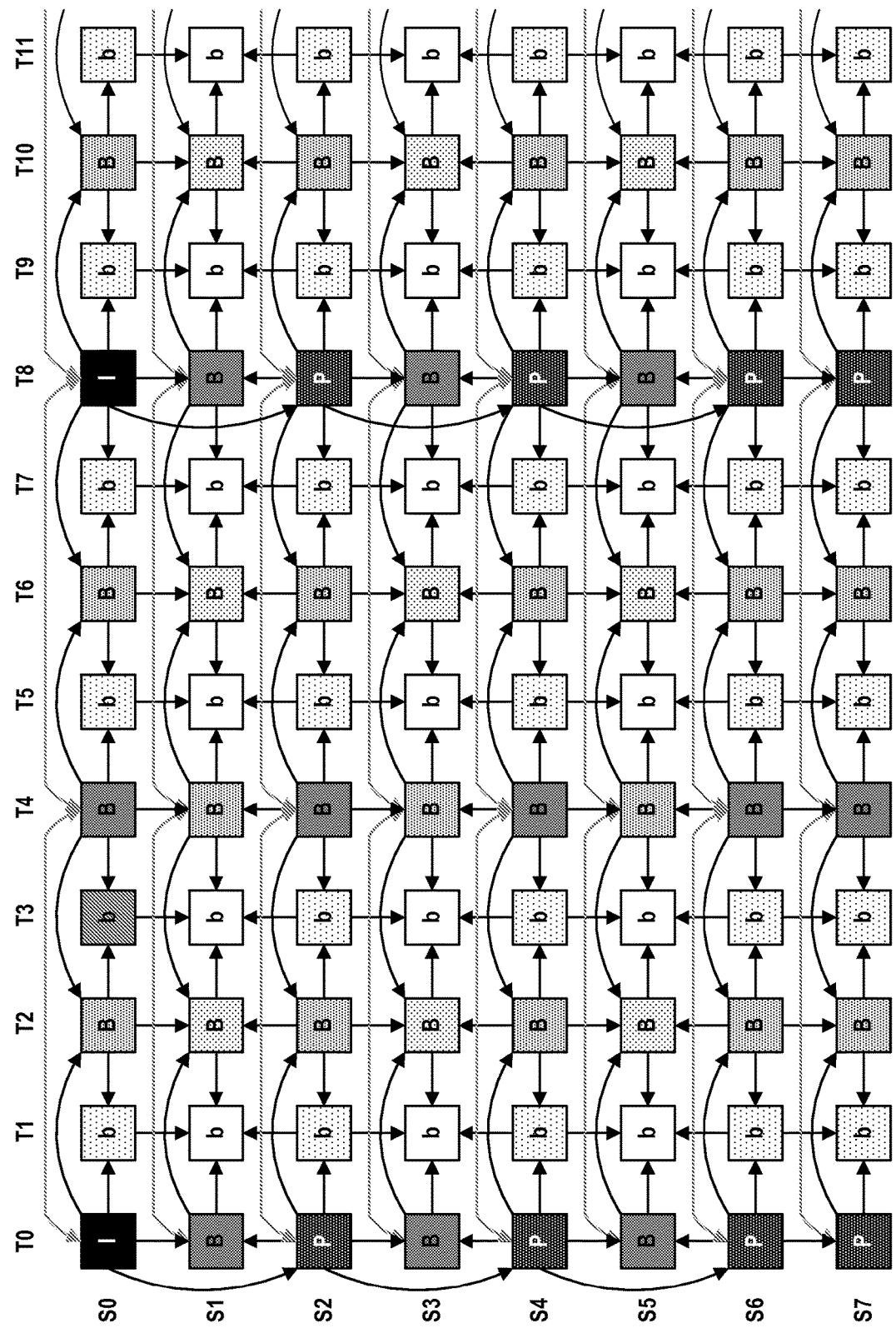
FIG. 4 is a conceptual diagram illustrating an example MVC prediction pattern.

FIG. 4 is a conceptual diagram illustrating an example MVC prediction pattern. While FIG. 4 is described with respect to H.264/AVC and MVC, it should be understood that a similar prediction pattern may be used with other multi view video coding schemes, including MV-HEVC and 3D-HEVC (multiview plus depth). Thus, references to MVC below apply to multiview video coding in general, and are not restricted to H.264/MVC.

In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 4 are indicated at the intersection of each row and each column in FIG. 4 using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0.

As with single view video encoding, pictures of a multi-view video coding video sequence may be predictively encoded with respect to pictures at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

In MVC, inter-view prediction is allowed among pictures in the same access unit (that is, with the same time instance). An access unit is, generally, a unit of data including all view components (e.g., all NAL units) for a common temporal instance. Thus, in MVC, inter-view prediction is permitted among pictures in the same access unit. When coding a picture in one of the non-base views, the picture may be added into a reference picture list, if it is in a different view but with the same time instance (e.g., the same POC value, and thus, in the same access unit). An inter-view prediction reference picture may be put in any position of a reference picture list, just like any inter prediction reference picture.

FIG. 4 provides various examples of inter-view prediction. Pictures of view S1, in the example of FIG. 4, are illustrated as being predicted from pictures at different temporal locations of view S1, as well as inter-view predicted from pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4, capital "B" and lowercase "b" are intended to indicate different hierarchical relationships between pictures, rather than different encoding methodologies. In general, capital "B" pictures are relatively higher in the prediction hierarchy than lowercase "b" pictures. FIG. 4 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 4 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices are implied in the SPS MVC extension, as specified in Annex H of H.264/AVC (the MVC amendment). In the SPS, for each index i, the corresponding view_id is signaled. In some examples, the decoding of the view components shall follow the ascending order of the view order index. If all the views are presented, then the view order indexes are in a consecutive order from 0 to num_views_minus_1.

In this manner, pictures used as reference pictures may be decoded before decoding the pictures that are encoded with reference to the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain pictures at equal levels of the hierarchy, decoding order may not matter relative to each other. For example, the I-frame of view S0 at temporal location T0 is used as a reference picture for the P-frame of view S2 at temporal location T0, which is in turn used as a reference picture for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view S1 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 4. Also, with respect to the example of FIG. 4, S0>S1, S2>S1, S2>S3, S4>S3, S4>S5, and S6>S5. Any decoding order for the views that does not violate these requirements is possible. Accordingly, many different decoding orders are possible.

According to aspects of this disclosure, a video coder (such as video encoder 20 or video decoder 30) may determine an output operation point having one or more target output layers. For example, video encoder 20 may determine one or more target output layers from the multi-view structure shown in FIG. 4 and encode data indicating the target output layers in an encoded bitstream. Likewise, video decoder 30 may determine an output operation point including the one or more target output layers based on data parsed and decoded from an encoded bitstream.

For example, video encoder 20 may encode a VPS extension (e.g., such as that shown and described with respect to the example of Table 2 above), a VPS (e.g., such as that shown and described with respect to the example of Table 3 above), an SEI message, or other message to indicate one or more output operation points, with each output operation point having associated target output layers. As noted above, when encoding depth views, an output operation point may refer to an operation point with a list of identified target output texture or depth views that belong to the views included in the operation point.

Video decoder 30 may receive the data and determine target output views for display. As an example, video decoder 30 may receive an operation point that includes views S0, S2, S4, and S6. Video decoder 30 may determine, based on syntax elements included in the bitstream, that target output views for a stereo output operation point include views S0 and S4. Video decoder 30 may decode each of S0, S2, S4, and S6, but may only output views S0 and S4.

Figure 5:
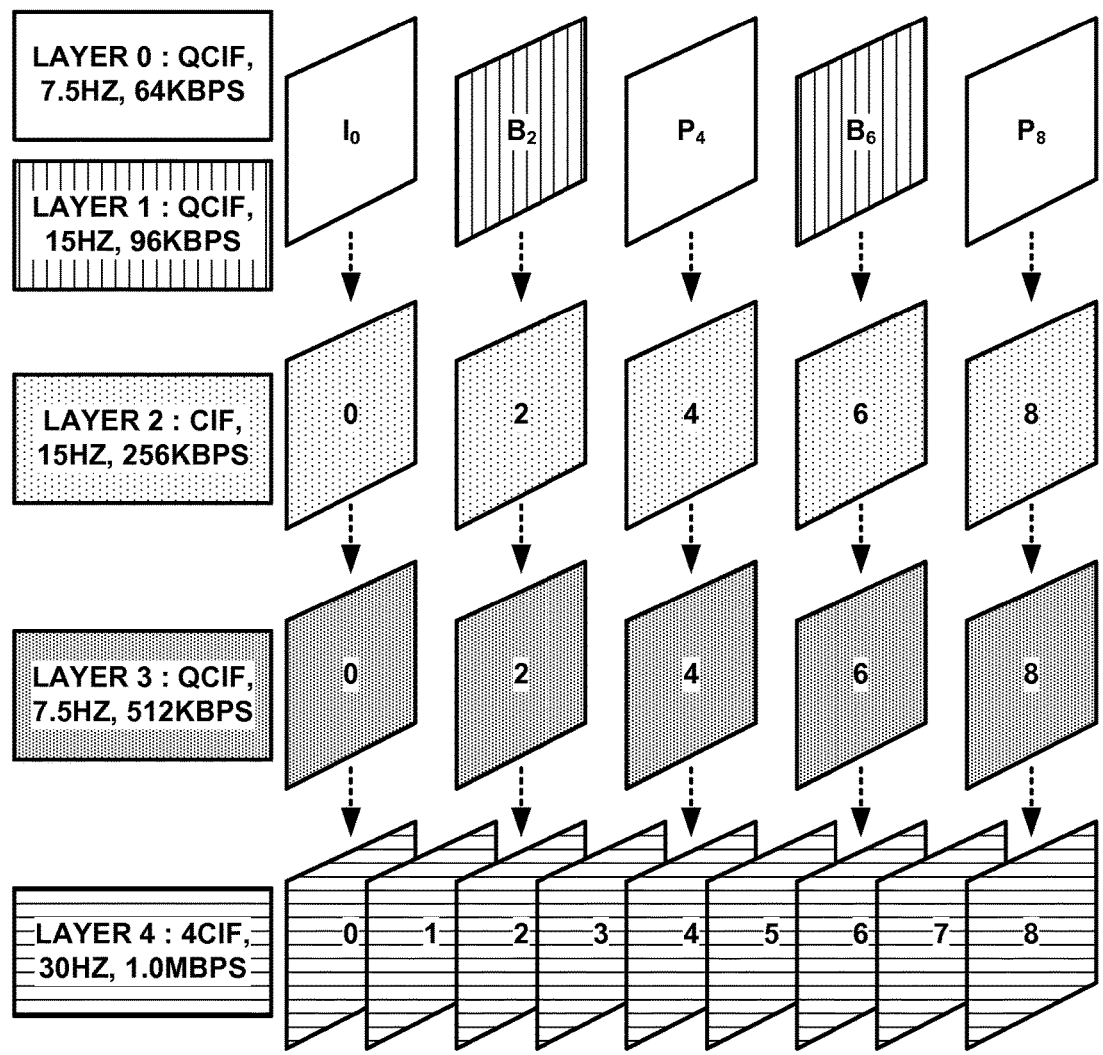
FIG. 5 is a conceptual diagram illustrating an example scalable video coding sequence.

FIG. 5 is a conceptual diagram illustrating scalable video coding. While FIG. 5 is described with respect to H.264/AVC and SVC, it should be understood that similar layers may be coded suing other multilayer video coding schemes, including HSVC. Thus, references to SVC below may apply to scalable video coding in general, and are not restricted to H.264/SVC.

In SVC, scalabilities may be enabled in three dimensions including, for example, spatial, temporal, and quality (represented as a bit rate or signal to noise ratio (SNR)). In general, better representation can be normally achieved by adding to a representation in any dimension. For example, in the example of FIG. 5, layer 0 is coded at Quarter Common Intermediate Format (QCIF) having a frame rate of 7.5 Hz and a bit rate of 64 kilobytes per second (KBPS). In addition, layer 1 is coded at QCIF having a frame rate of 15 Hz and a bit rate of 64 KBPS, layer 2 is coded at CIF having a frame rate of 15 Hz and a bit rate of 256 KBPS, layer 3 is coded at QCIF having a frame rate of 7.5 Hz and a bit rate of 512 KBPS, and layer 4 is coded at 4CIF having a frame rate of 30 Hz and a bit rate of Megabyte per second (MBPS). It should be understood that the particular number, contents and arrangement of the layers shown in FIG. 5 are provided for purposes of example only.

In any ease, once a video encoder (such as video encoder 20) has encoded content in such a scalable way, a video decoder (such as video decoder 30) may use an extractor tool to adapt the actual delivered content according to application requirements, which may be dependent e.g., on the client or the transmission channel.

In SVC, pictures having the lowest spatial and quality layer are typically compatible with H.264/AVC. In the example of FIG. 5, pictures with the lowest spatial and quality layer (pictures in layer 0 and layer 1, with QCIF resolution) may be compatible with H.264/AVC. Among them, those pictures of the lowest temporal level form the temporal base layer (layer 0). This temporal base layer (layer 0) may be enhanced with pictures of higher temporal levels (layer 1).

In addition to the H.264/AVC compatible layer, several spatial and/or quality enhancement layers may be added to provide spatial and/or quality scalabilities. Each spatial or quality enhancement layer itself may be temporally scalable, with the same temporal scalability structure as the H.264/AVC compatible layer.

According to aspects of this disclosure, a video coder (such as video encoder 20 or video decoder 30) may determine an output operation point having one or more target output layers. For example, video encoder 20 may determine one or more target output layers and encode data indicating the target output layers in an encoded bitstream. Likewise, video decoder 30 may determine an output operation point including one or more target output layers based on data parsed and decoded from an encoded bitstream.

In some examples, the target output layers may be derived based on a layer_id of an operation point. For example, video decoder 30 may decode an operation point that includes layer 0, layer 1, and layer 2. In this example, video decoder 30 may determine an output operation point based on the highest layer_id, e.g., layer 2. Accordingly, video decoder 30 may output pictures of layer 2 as target output pictures.

Figure 6:
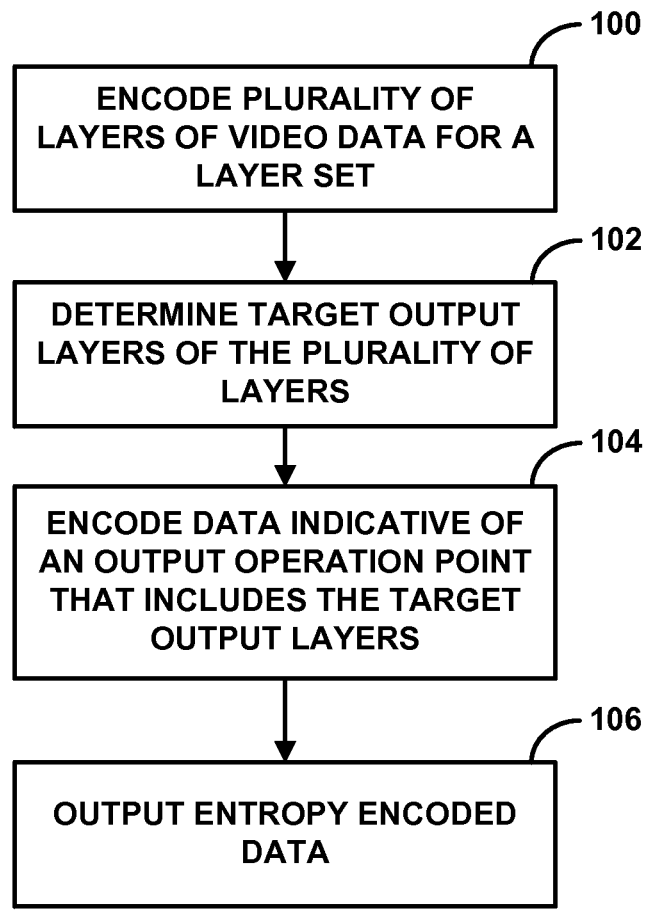
FIG. 6 is a flowchart illustrating an example process for encoding an output operation point, according to aspects of this disclosure.

FIG. 6 is a flowchart illustrating an example process for encoding an output operation point, according to aspects of this disclosure. Although described with respect to video encoder 20 (FIGS. 1 and 2), it should be understood that other devices may be configured to perform a method similar to that of FIG. 6.

In this example, video encoder 20 may encode a plurality of layers of video data for a layer set (100). For example, video encoder 20 may encode a plurality of views of video data for a multiview bitstream (including, for example, a bitstream that conforms k/de MV-HEVC standard or the 3D-HEVC standard). In this example, the layer set may include a plurality of views of video data needed to decode the bitstream, as well as views of video data intended for output, e.g., display by a client device decoding the bitstream. In another example, video encoder 20 may encode a plurality of scalable layers of video data for a scalable bitstream (including, for example, a bitstream that conforms to the HSVC standard). In this example, the layer set may include a plurality of layers of video data needed only to decode the bitstream (e.g., "not to be output layers"), as well as layers of video data intended for output.

Video encoder 20 may determine which of the plurality of layers are target output layers (102). The target output layers may include the layers intended for output, which provide a viewable representation of the video data when displayed. Target output layers may be selected based on a desired quality of a representation, capabilities of video coding devices, bandwidth considerations, or other factors.

Video encoder 20 may encode data indicative of an output operation point that includes the determined target output layers (104). For example, video encoder 20 may encode one or more syntax elements indicating the target output layers, and include such syntax elements in a parameter set. As described above with respect to Table 2 and Table 3, video encoder 20 may encode the data indicative of the output operation point in a VPS extension or VPS. In other examples, video encoder 20 may encode the data indicative of the output operation point in an SPS or other message. Video encoder 20 may then output the entropy encoded data (e.g., for storage or transmission to another device) (106).

Figure 7:
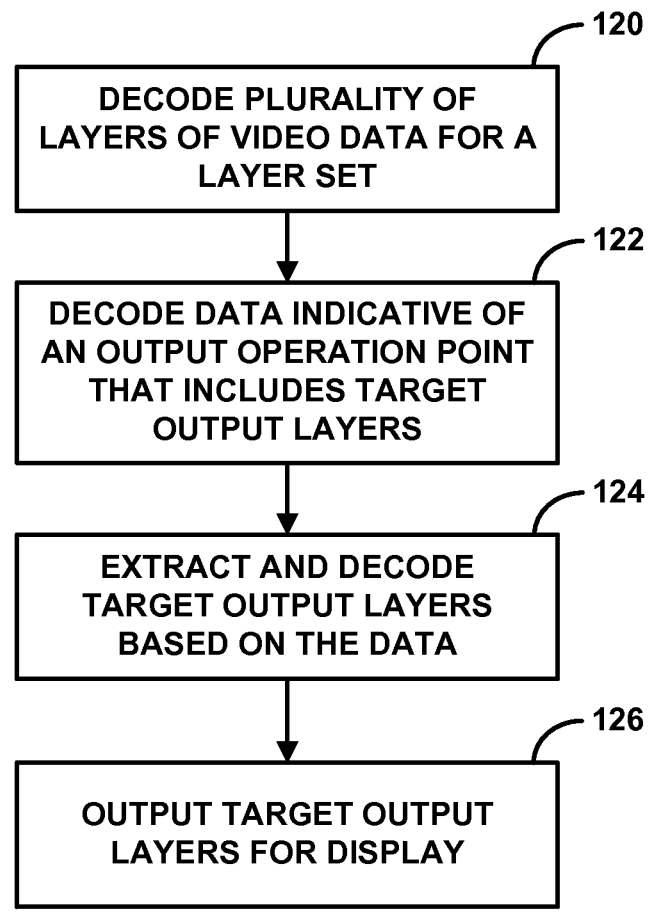
FIG. 7 is a flowchart illustrating an example process for decoding an output operation point, according to aspects of this disclosure.

FIG. 7 is a flowchart illustrating an example process for decoding an output operation point, according to aspects of this disclosure. Although described with respect to video decoder 30 (FIGS. 1 and 3), it should be understood that other devices may be configured to perform a method similar to that of FIG. 7.

Initially, video decoder 30 decodes a plurality of layers of video data for a layer set (120). For example, video decoder 30 may decode a plurality of views of video data of a multiview bitstream (including, for example, a bitstream that conforms to the MV-HEVC standard or the 3D-HEVC standard). In this example, the layer set may include a plurality of views of video data needed to decode the bitstream, as well as views of video data intended for output. In another example, video decoder 30 may decode a plurality of scalable layers of video data of a scalable bitstream (including, for example, a bitstream that conforms to the HSVC standard). In this example, the layer set may include a plurality of layers of video data needed to decode the bitstream, as web as layers of video data intended for output.

Video decoder 30 may also decode data indicative of an output operation point that includes one or more target output layers (122). As noted above, target output layers may include the layers intended for output, which provide a viewable representation of the video data when displayed. In some examples, the target output layers may be a sub-set of the plurality of layers that have been decoded.

The data indicative of the target output layers may include one or more syntax elements that indicate the target output layers. These syntax elements may be included in a VPS extension, a VPS, an SPS, or another type of message, as described above.

Video decoder 30 may extract the target output layers from the bitstream based on the data (124). For example, video decoder 30 may extract one or more sub-bitstreams containing the target output layers from the bitstream. Video decoder 30 may also decode the one or more sub-bitstreams. Video decoder 30 may then output the target output layers for display (e.g., for display by display device 32 (FIG. 1)) (126).

Accordingly, video decoder 30 obtains a plurality of layers of video data including a plurality of layer sets, where each layer set contains one or more layers of video data of the plurality of layers, and determines, based on one or more syntax elements of the bitstream, one or more output operation points, where each output operation point is associated with a layer set of the plurality of layer sets and one or more target output layers of the plurality of layers.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Certain aspects of this disclosure have been described with respect to the developing HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding, from a multilayer bitstream containing multilayer video data, an operation point comprising a set of layers of the multilayer video data, wherein the set of layers comprises one or more first target output layers of video data and at least one other layer of video data, and wherein the one or more first target output layers of video data are intended to be output for display;
   determining, from the multilayer bitstream, a value that indicates a number of output layer sets present in the multilayer bitstream, wherein respective output layer sets include respective one or more target output layers;

decoding, from the multilayer bitstream, one or more first syntax elements that indicate an output layer set among the number of layers sets, the first output layer set comprising the one or more first target output layers and not the at least one other layer of the set of layers of the operation point;

decoding, from the multilayer bitstream, one or more second syntax elements that indicate whether respective target output layers of the one or more target output layers is to be output; and based on the one or more second syntax elements indicating that at least one of the respective target output layer is to be output, outputting the indicated at least one respective target output layer.

2. The method of claim 1, wherein the one or more second syntax elements comprise a respective output layer flag for each target output layer.

3. The method of claim 1, wherein the multilayer bitstream comprises a multiview bitstream, such that each layer of the multilayer video data comprises a view of video data and the one or more target output layers comprise one or more target output views.

4. The method of claim 1, wherein the multilayer bitstream comprises one or more depth layers, such that the one or more second syntax elements indicate one or more target output depth layers comprising depth data.

5. The method of claim 1, wherein the multilayer bitstream comprises a bitstream having a plurality of scalable layers of video data, such that each layer of the multilayer video data comprises a scalable layer of video data and the one or more target output layers comprise one or more scalable target output layers.

6. The method of claim 5, wherein the one or more second syntax elements comprises a numerically highest layer_id syntax element.

7. The method of claim 1, further comprising:
marking a first decoded picture included in the one or more target output layers in a decoded picture buffer as a picture to be used for output; and
marking a second decoded picture included in the at least one other layer in the decoded picture buffer as a picture not to be used for output, such that the picture not to be used for output is removed from the decoded picture buffer earlier than the picture to be used for output.

8. The method of claim 7, further comprising:
determining whether the picture marked as not to be used for output is used for one of inter-prediction and inter-layer prediction; and
removing the picture marked as not to be used for output from the decoded picture buffer when the picture not to be used for output is not used for one of inter-prediction and inter-layer prediction.

9. The method of claim 1, wherein the one or more second syntax elements are included in one of a video parameter set (VPS) and a VPS extension of the encoded bitstream.

10. The method of claim 1, wherein the one or more second syntax elements are included in a supplemental enhancement information (SEI) message of the encoded bitstream.

11. A method for encoding video data, the method comprising:
encoding, as a multilayer bitstream containing multilayer video data, an operation point comprising a set of layers of the multilayer video data, wherein the set of layers comprises one or more first target output layers of video data and at least one other layer of video data, and wherein the one or more first target output layers of video data are intended to be output for display;

encoding, in the multilayer bitstream, a value that indicates a number of output layer sets present in the multilayer bitstream, wherein respective output layer sets include respective one or more target output layers;

encoding, in the multilayer bitstream, one or more first syntax elements that indicate an output layer set among the number of layers sets, the first output layer set comprising the one or more first target output layers and not the at least one other layer of the set of layers of the operation point;

encoding, in the multilayer bitstream, one or more second syntax elements that indicate whether respective target output layers of the one or more target output layers is to be output; and outputting the multilayer bitstream.

12. The method of claim 11, wherein the one or more second syntax elements comprise a respective output layer flag for each target output layer.

13. The method of claim 11, wherein the multilayer bitstream comprises a multiview bitstream, such that each layer of the multilayer video data comprises a view of video data and the one or more target output layers comprise one or more target output views.

14. The method of claim 11, wherein the multilayer bitstream comprises one or more depth layers, such that the one or more second syntax elements indicate one or more target output depth layers comprising depth data.

15. The method of claim 11, wherein the multilayer bitstream comprises a bitstream having a plurality of scalable layers of video data, such that each layer of the multilayer video data comprises a scalable layer of video data and the one or more target output layers comprise one or more scalable target output layers.

16. The method of claim 15, wherein the one or more second syntax elements comprise a numerically highest layer_id syntax element.

17. The method of claim 11, wherein encoding the one or more second syntax elements comprises including the one or more second syntax elements in one of a video parameter set (VPS) and a VPS extension of the encoded bitstream.

18. The method of claim 11, wherein encoding the one or more second syntax elements comprises including the one or more second syntax elements in a supplemental enhancement information (SEI) message of the encoded bitstream.

19. An apparatus for coding video data, the device comprising:
a memory configured to store a multilayer bitstream containing multilayer video data comprising a plurality of layers of video data; and
one or more processors configured to:
code an operation point comprising a set of layers of the multilayer video data, wherein the set of layers comprises one or more first target output layers of video data and at least one other layer of video data, and wherein the one or more target output layers of video data are intended to be output for display;
code a value, of the multilayer bitstream, that indicates a number of output layer sets present in the multilayer bitstream, wherein respective output layer sets include respective one or more target output layers;
code one or more first syntax elements, of the multilayer bitstream, that indicate an output layer set among the number of layers sets, the first output layer set comprising the one or more first target output layers and not the at least one other layer of the set of layers of the operation point; and code one or more second syntax elements, of the multilayer bitstream, that indicate whether respective target output layers of the one or more target output layers is to be output.

20. The apparatus of claim 19, wherein the one or more second syntax elements comprise a respective output layer flag for each target output layer.

21. The apparatus of claim 19, wherein coding comprises decoding and wherein the one or more processors are further configured to:

mark a first decoded picture included in the one or more target output layers in a decoded picture buffer as a picture to be used for output; and mark a second decoded picture included in the at least one other layer in the decoded picture buffer as a picture not to be used for output, such that the picture not to be used for output is removed from the decoded picture buffer earlier than the picture to be used for output.

22. The apparatus of claim 21, wherein the one or more processors are further configured to:

determine whether the picture marked as not to be used for output is used for one of inter-prediction and inter-layer prediction; and remove the picture marked as not to be used for output from the decoded picture buffer when the picture not to be used for output is not used for one of inter-prediction and inter-layer prediction.

23. A device for coding video data, the device comprising:

means for coding an operation point of a multilayer bitstream containing multilayer video data, the operation point comprising a set of layers of the multilayer video data, wherein the set of layers comprises one or more first target output layers of video data and at least one other layer of video data, and wherein the one or more target output layers of video data are intended to be output for display;

means for coding value, of the multilayer bitstream, that indicates a number of output layer sets present in the multilayer bitstream, wherein respective output layer sets include respective one or more target output layers;

means for coding one or more first syntax elements, of the multilayer bitstream, that indicate an output layer set among the number of layers sets, the first output layer set comprising the one or more first target output layers and not the at least one other layer of the set of layers of the operation point; and means for coding one or more second syntax elements, of the multilayer bitstream, that indicate whether respective target output layers of the one or more target output layers is to be output.

24. The device of claim 23, wherein the one or more second syntax elements comprise a respective output layer flag for each target output layer.

25. The device of claim 23, further comprising:

means for marking a first decoded picture included in the one or more target output layers in a decoded picture buffer as a picture to be used for output; and means for marking a second decoded picture included in the at least one other layer in the decoded picture buffer as a picture not to be used for output, such that the picture not to be used for output is removed from the decoded picture buffer earlier than the picture to be used for output.

26. The device of claim 25, further comprising:

means for determining whether the picture marked as not to be used for output is used for one of inter-prediction and inter-layer prediction; and means for removing the picture marked as not to be used for output from the decoded picture buffer when the picture not to be used for output is not used for one of inter-prediction and inter-layer prediction.

27. A non-transitory computer-readable storage medium having stored thereon instructions that, when executed, cause a processor of a device for coding video data to:

code an operation point of a multilayer bitstream containing multilayer video data, the operation point comprising a set of layers of the multilayer video data, wherein the set of layers comprises one or more first target output layers of video data and at least one other layer of video data, and wherein the one or more target output layers of video data are intended to be output for display;

code a value, of the multilayer bitstream, that indicates a number of output layer sets present in the multilayer bitstream, wherein respective output layer sets include respective one or more target output layers;

code one or more first syntax elements, of the multilayer bitstream, that indicate an output layer set among the number of layers sets, the first output layer set comprising the one or more first target output layers and not the at least one other layer of the set of layers of the operation point; and code one or more second syntax elements, of the multilayer bitstream, that indicate whether respective target output layers of the one or more target output layers is to be output.

28. The non-transitory computer-readable storage medium of claim 27, wherein the one or more second syntax elements comprise a respective output layer flag for each target output layer.

29. The non-transitory computer-readable storage medium of claim 27, wherein the instructions further cause the one or more processors to:

mark a first decoded picture included in the one or more target output layers in a decoded picture buffer as a picture to be used for output; and mark a second decoded picture included in the at least one other layer in the decoded picture buffer as a picture not to be used for output, such that the picture not to be used for output is removed from the decoded picture buffer earlier than the picture to be used for output.

30. The non-transitory computer-readable storage medium of claim 29, wherein the instructions further cause the one or more processors to:

determine whether the picture marked as not to be used for output is used for one of inter-prediction and inter-layer prediction; and remove the picture marked as not to be used for output from the decoded picture buffer when the picture not to be used for output is not used for one of inter-prediction and inter-layer prediction.

* * * * *